US008864425B2

(12) United States Patent
Osawa et al.

(10) Patent No.: US 8,864,425 B2
(45) Date of Patent: Oct. 21, 2014

(54) BEVEL HEAD REPLACEABLE ROTARY TOOL, BEVEL HEAD AND TOOL BODY

(75) Inventors: Jiro Osawa, Toyokawa (JP); Tasuku Itoh, Toyokawa (JP)

(73) Assignee: OSG Corporation, Toyokawa (JP)

( * ) Notice: Subject to any disclaimer, the term of this patent is extended or adjusted under 35 U.S.C. 154(b) by 577 days.

(21) Appl. No.: 13/147,057

(22) PCT Filed: Feb. 4, 2009

(86) PCT No.: PCT/JP2009/051884
§ 371 (c)(1),
(2), (4) Date: Jul. 29, 2011

(87) PCT Pub. No.: WO2010/089861
PCT Pub. Date: Aug. 12, 2010

(65) Prior Publication Data
US 2012/0121347 A1    May 17, 2012

(51) Int. Cl.
*B23B 51/02*    (2006.01)
(52) U.S. Cl.
CPC ............. *B23B 51/02* (2013.01); *B23B 2251/02* (2013.01); *B23B 2250/12* (2013.01); *B23C 2210/02* (2013.01); *Y10S 408/713* (2013.01)
USPC ........... 408/233; 408/230; 408/713; 408/144; 408/57
(58) Field of Classification Search
CPC .... B23B 51/00; B23B 51/02; B23B 2222/28; B23B 2251/02
USPC ............. 408/713, 230, 144, 238, 239 R, 231, 408/233, 226, 232, 227
See application file for complete search history.

(56) References Cited

U.S. PATENT DOCUMENTS

| 756,339 | A | * | 4/1904 | Down ......................... 408/233 |
| 3,153,356 | A | | 10/1964 | Dearborn |
| 5,114,286 | A | * | 5/1992 | Calkins ....................... 408/226 |

(Continued)

FOREIGN PATENT DOCUMENTS

CN    1413131 A    4/2003
JP    A-2003-505261    2/2003

(Continued)

OTHER PUBLICATIONS

International Search Report mailed Apr. 21, 2009 issued in International Patent Application No. PCT/JP2009/051884 (with translation).

*Primary Examiner* — Eric A Gates
*Assistant Examiner* — Paul M Janeski
(74) *Attorney, Agent, or Firm* — Oliff PLC (57) ABSTRACT

A bevel head replaceable rotary tool is provided. The rotary tool includes a coupling protrusion and a coupling recess, plural sets of serrations provided on an outer circumferential surface of the coupling protrusion and an inner wall surface of the coupling recess, circumferential abutting portions provided on the tool body and the bevel head, and axial tight-contact portions, provided on the tool body and the bevel head. The serrations of the coupling protrusion and the serrations of the coupling recess arranged such that curvatures of circumferential circular arcs of the serrations of the coupling protrusion are greater than those of the serrations of the coupling recess or the serrations of the coupling protrusion and the serrations of the coupling recess have circumferential circular arcs with centers deviated from each other.

12 Claims, 6 Drawing Sheets

(56) References Cited

U.S. PATENT DOCUMENTS

| | | | |
|---|---|---|---|
| 6,276,879 B1 * | 8/2001 | Hecht | 409/234 |
| 6,582,164 B1 | 6/2003 | McCormick | |
| 7,004,691 B2 * | 2/2006 | Nomura | 408/59 |
| 7,048,480 B2 * | 5/2006 | Borschert et al. | 408/144 |
| 7,070,367 B2 * | 7/2006 | Krenzer | 408/226 |
| 7,374,376 B2 * | 5/2008 | Jonsson et al. | 408/233 |
| 7,377,730 B2 * | 5/2008 | Hecht et al. | 408/231 |
| 7,467,915 B2 * | 12/2008 | de Souza | 408/231 |
| 7,591,617 B2 * | 9/2009 | Borschert et al. | 408/226 |
| 2001/0018013 A1 | 8/2001 | Eng et al. | |
| 2002/0159851 A1 | 10/2002 | Krenzer | |
| 2004/0131434 A1 * | 7/2004 | Giessler | 408/59 |
| 2004/0208716 A1 | 10/2004 | Krenzer | |
| 2005/0084352 A1 | 4/2005 | Borschert et al. | |
| 2008/0193238 A1 | 8/2008 | Hecht | |
| 2008/0213053 A1 | 9/2008 | Borschert et al. | |
| 2010/0266357 A1 * | 10/2010 | Kretzschmann et al. | 408/204 |

FOREIGN PATENT DOCUMENTS

| | | |
|---|---|---|
| JP | A-2003-136319 | 5/2003 |
| JP | A-2003-517942 | 6/2003 |
| JP | A-2003-245813 | 9/2003 |
| JP | A-2004-209615 | 7/2004 |
| JP | A-2005-517539 | 6/2005 |
| JP | WO 2008/099378 A1 | 8/2008 |
| WO | WO 2008/072840 A2 | 6/2008 |

\* cited by examiner

BEVEL HEAD REPLACEABLE ROTARY TOOL, BEVEL HEAD AND TOOL BODY

FIELD OF THE INVENTION

This invention relates to, bevel head replaceable rotary tools and, more particularly to, a bevel head replaceable rotary tool having a bevel head enabled to be easily and quickly mounted and detached by one-touch action in a stable firm mounting state with no occurrence of loosening or limping thereof.

BACKGROUND OF THE INVENTION

A bevel head replaceable rotary tool has heretofore been known having a shaft-like tool body and a bevel head formed as a separate body from the tool body with the bevel head arranged to be detachably mounted on the tool body at a leading end thereof in concentric relation thereto for use. A drill, disclosed in Patent Publication 1, represents such an example in which a bevel head is integrally fixed to a tool body by means of two fastening screws with both components having mating surfaces formed with radially extending concave and convex portions through which torque is transferred. With such a bevel head replaceable rotary tool, the tool body can be reused upon replacement of only the bevel head when tool life is reached due to wear of a cutting edge or the like. This is more economical when compared to a case in which a whole of the tool is replaced with a capability of achieving effective utilization of resources.

Patent Publication 1: Japanese Patent Application Publication No. 2003-136319

DISCLOSURE OF THE INVENTION

However, when fixing the bevel head onto the tool body with the use of such fastening screws, not only a need arises to prepare the fastening screws with a resultant increase in the number of component parts but also a need arises troublesome work to be done for achieving phase adjustment between the bevel head and the tool body about a center axis for screwing the fastening screws. None of such consequences has been necessarily satisfied in adequate results.

Figure 6A:
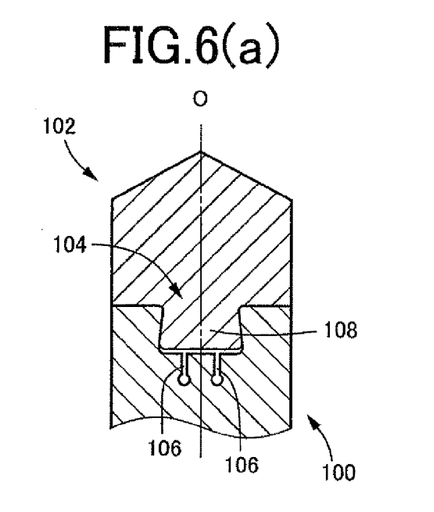
FIG. 6(a)-(b) are cross-sectional views showing a conventional fitting engagement with a tapered protrusion in an inverted tapered shape.
Figure 6B:
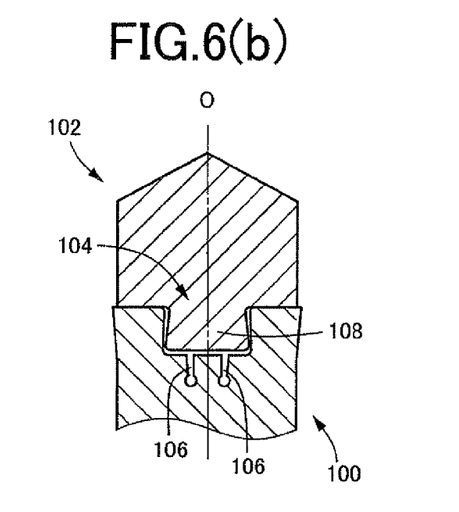

Further, a consideration has been taken in that, as shown in FIG. 6(a), a tool body 100 has a leading end formed with a tapered recess 104, extending in a direction perpendicular to a tool axis "O", for fitting engagement with a tapered protrusion 108 formed on the bevel head 102 in an inverted tapered shape. This causes the tapered protrusion 108 to be pulled into the tapered recess 104 and fixed due to elasticity of slotted grooves 106. In such a case, however, a tapered angle needs to be small for the purpose of avoiding the occurrence of stress concentration acting on a constricted portion of the tapered protrusion 108. This causes the slotted grooves 106 to be opened owing to cutting resistance, as shown in FIG. 6(b), with a resultant occurrence of limping of the bevel head 102 or a resultant decrease in clamping force due to repeated circles of use. This results in an issue of a difficulty caused in obtaining an appropriate mounting state in a stable fashion.

The present invention has been completed with the above view in mind and has an object to provide a bevel head replaceable rotary tool which enables the bevel head to be detachably mounted on the tool body in an easy and quick fashion by one-touch action to stably obtain a firm mounting state with no occurrence of loosening or limping of the bevel head.

The object indicated above can be achieved according to a first aspect of the present invention, which provides a bevel head replaceable rotary tool having a shaft-like tool body and a bevel head, formed as a separate body from the tool body, which is detachably mounted on the tool body at a leading end thereof in a concentric relation thereto, the rotary tool comprising: (a) a coupling protrusion and a coupling recess, provided on one and the other one of the tool body and the bevel head for fitting engagement in a tool axis direction, which are non-circular in shape in cross section perpendicular to a tool axis "O"; (b) plural sets of serrations provided on an outer circumferential surface of the coupling protrusion and an inner wall surface of the coupling recess, respectively, to be separate from each other in circumferential directions under which rotating the tool body about the tool axis "O" relative to the bevel head in a tool rotating direction with the coupling protrusion and the coupling recess held in fitting engagement in the tool axis direction allows the plural sets of serrations to mesh with each other, respectively, such that the bevel head is blocked from escaping from the tool body in the tool axis direction; (c) circumferential abutting portions provided on the tool body and the bevel head, respectively, which are abutted with each other when the tool body is caused to rotate (about the tool axis "O") relative to the bevel head in the tool rotating direction with the sets of serrations held in meshing engagement such that a mounting phase about the tool axis "O" is defined; and (d) axial tight-contact portions, provided on the tool body and the bevel head, respectively, which are brought into tight contact with each other in the tool axis direction under predetermined pressing loads on the mounting phase when the tool body is caused to rotate relative to the bevel head in the tool rotating direction with sets of serrations held in fitting engagement.

The "tool rotating direction" means a rotating direction of the tool by which a predetermined working such as hole-cutting work by rotatively driving a bevel head replaceable rotary tool.

The object indicated above can be achieved according to a second aspect of the present invention, which provides the bevel head replaceable rotary tool according to the first aspect, wherein the serrations are inclined at predetermined inclined angles ϕ from directions perpendicular to the tool axis "O" so as to allow the bevel head and the tool body to move closer to each other in the tool axis direction when the tool body is caused to rotate (about the tool axis "O") relative to the bevel head in the tool rotating direction with the tool body with the set of serrations held in meshing engagement.

The object indicated above can be achieved according to a third aspect of the present invention, which provides the bevel head replaceable rotary tool according to the second aspect, wherein the predetermined inclined angles ϕ of the serrations of the coupling protrusion and the serrations of the coupling recess fall in a range of $0° \leq \phi \leq 15°$ and the predetermined inclined angle ϕ of at least one of the serrations of the coupling protrusion and the serrations of the coupling recess is positive to allow the bevel head and the tool body to move closer to each other in the tool axis direction when the tool body is caused to rotate relative to the bevel head in the tool rotating direction with the serrations held in meshing engagement with each other; and the axial tight-contact portions, provided on the tool body and the bevel head, respectively, have flattened tight contact surfaces nearly perpendicular to the tool axis "O" for engagement in surface contact with each other.

The object indicated above can be achieved according to a fourth aspect of the present invention, which provides the bevel head replaceable rotary tool according to any one of the first to third aspects, wherein the serrations of the coupling protrusion and the serrations of the coupling recess have specifications different from each other so as to mesh with each other under predetermined meshing loads in the mounting phase when the tool body is caused to rotate about the tool axis "O" relative to the bevel head in the tool rotating direction with the set of serrations held in meshing engagement with each other.

The object indicated above can be achieved according to a fifth aspect of the present invention, which provides the bevel head replaceable rotary tool according to any one of the first to fourth aspects, wherein the circumferential abutting portions have inclined surfaces inclined at predetermined inclined angles θ from directions parallel to the tool axis "O" to cause forces to act in directions where the circumferential abutting portions are pulled in the tool axis direction each other.

The object indicated above can be achieved according to a sixth aspect of the present invention, which provides the bevel head replaceable rotary tool according to any one of the first to fifth aspects, wherein the serrations of the coupling protrusion and the serrations of the coupling recess are arranged such that curvatures of circumferential circular arcs of the serrations of the coupling protrusion are made greater than those of the serrations of the coupling recess or the serrations of the coupling protrusion and the serrations of the coupling recess have circumferential circular arcs with centers deviated from each other whereby when the tool body is caused to rotate relative to the bevel head in the tool rotating direction, the serrations are brought into meshing engagement with each other.

The object indicated above can be achieved according to a seventh aspect of the present invention, which provides the bevel head replaceable rotary tool according to any one of the first to sixth aspects, wherein the serrations have protrusions having triangular shape in with apex angles falling in a range between 25° and 120°.

The object indicated above can be achieved according to an eighth aspect of the present invention, which provides the bevel head replaceable rotary tool according to any one of the first to seventh aspects, wherein the serrations have plural protrusions, separated in the tool axis direction, which have specifications different from each other for meshing engagement only when the coupling protrusion and the coupling recess are completely brought into fitting engagement with each other in the tool axis direction.

The object indicated above can be achieved according to a ninth aspect of the present invention, which provides the bevel head replaceable rotary tool according to any one of the first to eighth aspects, wherein one and the other one of a leading end of the coupling protrusion and a bottom portion of the coupling recess include a positioning pin and a positioning hole formed on the tool axis "O" for fitting engagement to be rotatable relative to each other.

The object indicated above can be achieved according to a tenth aspect of the present invention, which provides the bevel head replaceable rotary tool according to any one of the first to ninth aspects, wherein the bevel head is made of cemented carbide and the coupling protrusion is provided on the bevel head while the coupling recess is provided on the tool body.

The object indicated above can be achieved according to a eleventh aspect of the present invention, which provides the bevel head replaceable rotary tool according to any one of the first to tenth aspects, wherein the coupling protrusion is formed in an elongated shape symmetric with respect to the tool axis "O" in cross section perpendicular to the tool axis "O" and the serrations are provided on the coupling protrusion at both elongated ends thereof for meshing engagement with the pair of serrations formed on the inner wall surface of the coupling recess to be symmetric with regard to the tool axis "O".

The object indicated above can be achieved according to a twelfth aspect of the present invention, which provides the bevel head replaceable rotary tool according to any one of the first to eleventh aspects, wherein the bevel head replaceable rotary tool includes a two-blade twist drill having a pair of spiral flutes formed to be symmetric with respect to the tool axis "O" and straddling the bevel head and the tool body in contiguous fashions, and wherein the coupling recess is formed in a way to straddle the pair of spiral flutes to penetrate in a direction perpendicular to the tool axis "O".

The object indicated above can be achieved according to a thirteenth aspect of the present invention, which provides the bevel head replaceable rotary tool according to the twelfth aspect, wherein the tool body has a fluid supply hole formed on the tool axis "O" and bifurcated in a Y-shape at the vicinity of the leading end at which the bevel head is mounted, and openings of the bifurcated fluid supply hole are formed on the pair of spiral flutes.

The object indicated above can be achieved according to a fourteenth aspect of the present invention, which provides a bevel head for use in the bevel head replaceable rotary tool defined in any one of the first to thirteenth aspects.

The object indicated above can be achieved according to a fifteenth aspect of the present invention, which provides a tool body for use in the bevel head replaceable rotary tool defined in any one of the first to thirteenth aspects.

In such a bevel head replaceable rotary tool, the tool body is caused to rotate relative to the bevel head in the tool rotating direction with the coupling protrusion and the coupling recess formed on one and the other of the tool body and the bevel head for fitting engagement with each other in the tool axis direction. This allows a plurality of sets of serrations, formed on the coupling protrusion and the coupling recess in areas separate from each other in a circumferential direction, to be brought into meshing engagement with each other. This blocks the occurrence of drop-off of the bevel head while causing the circumferential abutting portions to be brought into abutting engagement with each other, thereby defining the mounting phase about the tool axis "O". In addition, when demounting the bevel head from the tool body, the bevel head and the tool body may suffice to be rotated relative to each other in opposite directions, enabling the mounting and demounting to be easily and quickly performed on one touch action.

Meanwhile, as the tool body is caused to rotate relative to the bevel head to the mounting phase with the plurality of sets of serrations held in meshing engagement with each other; the axial tight-contact portions, formed on the bevel head and the tool body in areas symmetric with respect to the tool axis "O" respectively, are brought into tight contact with each other in the tool axis direction under the predetermined pressing loads. This prevents the occurrence of loosening or limping of the bevel head due to friction between the axial tight-contact portions. This allows the circumferential abutting portions to define the mounting phase about the tool axis "O", while enabling a firm coupling state (mounted state) to be stably obtained during the use of the tool.

In the second aspect, the serrations are inclined at the predetermined inclined angles φ in the direction perpendicular to the tool axis "O". This allows the bevel head and the tool body to move closer to each other in the tool axis direction when the bevel head and the tool body are caused to rotate relative to each other in the tool rotating direction with the two sets of serrations held in meshing engagement with each other. Thus, the axial tight-contact portions can be appropriately held in tight contact with each other owing to the serrations being inclined, thereby providing a firm coupling state in a stable fashion. In particular, in the third aspect, the inclined angle φ falls in a range expressed as 0°≤φ≤15° and the axial tight-contact portions take the form of the flattened surfaces that are brought into surface contact with each other at nearly right angles with respect to the tool axis "O". This allows the wedge action to occur in the presence of such a small inclined angle φ whereby the axial tight-contact portions can be brought into tight contact with each other to be firmly fixed in the presence of friction. This appropriately prevents the occurrence of loosening or limping of the bevel head, while favorably keeping coupling strength even when the bevel head is repeatedly mounted on or demounted from the tool body.

In the fourth aspect, the serrations of the coupling protrusion and the serrations of the coupling recess have the various parameters (such as a pitch in the axial tool direction and the inclined angle φ) that are slightly different from each other for meshing engagement with each other under the relatively large meshing loads when relatively rotated to the mounting phase. This appropriately prevents the occurrence of loosening or limping of the bevel head 14 even in the presence of mutual frictions among the serrations due to meshing load. This results in, in cooperation with friction between the axial tight-contact portions, further increases in coupling strength such that a further stable coupling state is favorably maintained. By the differences of the various parameters, in the case that the serrations are abuttingly contact in the axial tool direction in a predetermined pressing load, it is possible that the serration themselves is regarded as the axial tight-contact portion.

In the fifth aspect, furthermore, the circumferential abutting portions, playing a role as the circumferential abutting portions, are arranged to generate forces acting to pull the circumferential abutting portions each other toward the tool axis in the direction parallel to the tool axis "O" on the inclined surfaces inclined at the given inclined angles θ. This results in an effect to cause the axial tight-contact portions to be further firmly brought into tight contact with each other due to torque applied to the circumferential abutting portions when the bevel head replacement twist drill is drivably rotated in the tool rotating direction to perform hole cutting work. This makes it possible to appropriately perform cutting work with no occurrence of loosening or limping of the bevel head even when subjected to large cutting torque (rotational resistance).

With the present embodiment, moreover, the serrations, formed on the coupling protrusion, have the circumferential circular arcs with the respective curvatures made greater than those of the serrations formed on the coupling recess. This allows meshing engagement to be easily performed when the tool body is caused to rotate in the tool rotating direction relative to the bevel head with the serrations brought into meshing engagement with each other. This suppresses the occurrence of restraints of the serrations during the meshing engagements such that smooth meshing engagements can be achieved. Further, since rotating the tool body and the bevel head are rotated relative to each other until the circumferential abutting portions are brought into a mounting phase for abutting engagement, the serrations can be appropriately brought into meshing engagement with each other. This makes it possible to have predetermined coupling strength, thereby enabling coupling work (engaging work) of the bevel head to be further easily performed.

In the seventh aspect, besides, the protrusions of the serrations are formed in the triangular ridge shapes with each apex angle ranging from 25° to 120°. Thus, the coupling condition can be favorably maintained even owing to the occurrence of meshing frictions among the serrations.

In the eighth aspect, the serrations are formed in a plurality of protrusions, respectively, and the plurality of protrusions have various parameters different from each other so as to achieve the meshing engagements only when the coupling protrusion and the coupling recess are completely brought into fitting engagement with each other in the tool axis direction. This reliably prevents the occurrence of a failure of causing the bevel head to be mounted on the tool body in a state remained under incomplete fitting engagement.

In the ninth aspect, further, the positioning pin and the positioning hole are formed on the leading end of the coupling protrusion and the bottom of the coupling recess on the tool axis "O", respectively, for fitting engagement with each other in rotating capabilities relative to each other. This allows the bevel head and the tool body to be positioned in concentric relation such that coupling work can be further smoothly and easily performed when these components are caused to rotate relative to each other with the serrations brought into meshing engagement with each other.

With the present embodiment, furthermore, the bevel head is made of cemented carbide such that the coupling protrusion is formed on the bevel head. This enables the bevel head, having the coupling protrusion and the serrations and the cutting edge or the like, to be unitarily formed in easy fashion using a molding die. The tool body, formed with the coupling recess, is made of, for instance, high-speed tool steel, thereby enabling the coupling recess and the serrations to be relatively easily formed by cutting work or electric spark machining, etc.

In the eleventh aspect, moreover, the coupling protrusion has an elongated shape symmetric with respect to the tool axis "O" in cross section perpendicular to the tool axis "O" and has both longitudinal end portions formed with the serrations for meshing engagements with the pair of the serrations formed on the inner circumferential surface of the coupling recess in shapes symmetric with respect to the tool axis "O". Thus, the two sets of serrations enables the bevel head to be appropriately mount onto the tool body in a stable mounting attitude.

In the twelfth aspect, relating to the two-blade twist drill having the pair of spiral flutes continuously formed on the bevel head and the tool body so as to straddle the same. With the coupling recess formed in a way to straddle the pair of spiral flutes so as to extend in a direction perpendicular to the tool axis "O", the present invention is preferably applicable.

In the thirteenth aspect, in the above twist drill, the tool body has the fluid supply hole formed on the tool axis "O" to be bifurcated in the Y-shape at the vicinity of the leading end, at which the bevel head is mounted, to be opened at the pair of spiral flutes, respectively. This enables a fluid, such as lubricating oil and cooling air, etc., to be appropriately supplied to the vicinity of the bevel head with no need arising for the bevel head to have a fluid supply hole with a resultant structure that is simple and low cost.

In the fourteenth and fifteenth aspects relating to the bevel head and tool body for use in the bevel head replaceable rotary tool, the same effects as substantively in the first to thirteenth aspects can be obtained.

BRIEF DESCRIPTION OF THE DRAWINGS

FIGS. 1(a)-(e) are views showing a bevel head replacement twist drill of one embodiment of the present invention; FIG.

1(a) is a front view of the drill as viewed in a direction perpendicular to a tool axis "O"

NOMENCLATURE OF ELEMENTS

10: bevel head replaceable twist drill 12: tool body 14: bevel head 20, 22: spiral flutes 30: coupling protrusion 32: coupling recess 34a, 34b, 36a, 36b, 50a, 50b, 60a, 60b, 62a, 62b: serrations 40: poisoning pin 44a, 44b: abutting surfaces (circumferential abutting portions, inclined surfaces) 46a, 46b: tight contact surfaces (axial tight-contact portions) 48: fluid supply hole O: tool axis φ: inclined angle of serration θ: inclined angle of circumferential abutting portion

BEST MODE FOR CARRYING OUT THE INVENTION

A bevel head replaceable rotary tool of the present invention can be applied to various rotary tools such as a twist drill, an end mill and a tap each having a plurality of spiral flutes twisted about a tool axis "O", a rotary cutting tool such as a straight fluted-drill, etc., which has a straight flute extending in parallel to the tool axis "O", or a rotary grinding tool or the like.

A coupling protrusion and a coupling recess, non-circular in cross section perpendicular to the tool axis "O", are formed in, for instance, rectangle or oval shapes in cross section but may take convexed portions or concaved portions in various cross sections like trifurcated shapes, cruciform shapes and polygonal shapes. Serrations are formed in plural sets which are circumferentially separate from each other depending on cross-sectional shapes of the coupling protrusion and the coupling recess. In addition, the coupling protrusion and the coupling recess are formed in parallel to, for instance, the tool axis "O" but may be possible to be formed in inversed tapered-shapes as shown in FIG. 6.

Circumferential abutting portions may be preferably formed in inclined surfaces inclined in directions parallel to the tool axis "O" at a predetermined inclined angle of θ, causing forces to act in directions where the circumferential abutting portions pull each other in, for instance, a tool axis direction, which may preferably fall in the order of, for instance, 0°<θ≤30°. However, the inclined angle may take a value of θ=0 in the first aspect of the present invention or may be possibly inclined in opposite directions if the degree is small. The circumferential abutting portions may be preferably provided in plural areas about the tool axis "O" at equiangular intervals.

Axial tight-contact portions have structures including serrations inclined at, for instance, predetermined inclined angles φ such that the bevel head and the tool body are caused to move relative to each other in the tool axis direction to be brought into tight contact with each other. The inclined angles φ of the serrations, formed on the coupling protrusion and the coupling recess, respectively, may fall in a range of 0°≤φ≤15° and the inclined angle φ of at least one of the serrations of the coupling protrusion and the coupling recess is made positive. That is, if the inclined angle of at least one of the serrations of the coupling protrusion and the coupling recess is positive, the fitting engagement can be performed in the presence of play even if the inclined angle φ of the other one is expressed as φ=0°. Thus, the tight-contact portions can be moved closer to each other in the tool axis direction in the presence of the serrations of the one being inclined.

Both of the inclined angles φ of the serrations, formed on the coupling protrusion and the coupling recess, respectively, may be angled at 0° and the axial tight-contact portions may be arranged to include the inclined surfaces that are inclined in directions perpendicular to the tool axis "O" at predetermined inclined angles. This enables the tight-contact portions to be brought into tight contact with each other in the tool axis direction under predetermined pressing forces. In summary, it may suffice for any one of or both of the serrations and the axial tight-contact portions to be inclined such that the axial tight-contact portions are brought into tight contact with each other in the tool axis direction under the predetermined pressing forces. The inclined angles φ of the serrations may be greater than a value of 15° or the serrations can be inclined on negative sides, i.e., in opposite directions. The axial tight-contact portions may be preferably provided in plural areas about the tool axis "O" at equiangular intervals.

The serrations of the coupling protrusion and the coupling recess may be arranged to have various parameters (specifications), i.e., for instance, pitches in the tool axial direction and the inclined angles φ or the like of protrusions different from each other. This allows the relevant serrations to mesh with each other under lessened meshing loads in an early meshing stage whereas, during the mounting phase, the relevant serrations can be brought into meshing engagement with each other under relatively large meshing loads. This causes the bevel head to be firmly fixed to the tool body. However, the serrations of both component parts may be arranged to have parameters nearly equal to each other such that the bevel head can be fixed to the tool body mainly in terms of frictions between the axial tight-contact portions.

The serrations of the coupling protrusion and the coupling recess may preferably have circular arcs with the curvatures made different from each other or with the centers deviated from each other. This allows easy meshing engagement to be accomplished, i.e., relatively increased play is provided on a side at which the meshing engagement starts, during a phase in which the tool body is caused to rotate relative to the bevel head in the tool rotating direction for meshing engagement with each other. However, the serrations may be possible to have effective diameters in concentric relation to the tool axis "O" to be nearly equal to each other with no need to cause the curvatures to be different from each other or to cause the centers of the circular arcs to be deviated from each other. In addition, various modifications may be possibly made to have improved meshing engagement merely by chamfering ridge portions of the serrations at leading end thereof on meshing sides.

The serrations may preferably have protrusions formed in triangular ridge shapes with each apex angle falling in a value ranging from 25° to 120°. However, various modifications may be possible to allow the serrations to have circular arc configurations (corrugated shapes) in squared shapes or semi circular arcs, etc., in cross section. The serrations may preferably have plural protrusions formed separately of each other in the tool axis direction with the plural protrusions arranged to have various parameters different from each other to as to accomplish meshing engagement only when the coupling protrusion and the coupling recess are completely brought into engagement with each other in the tool axis direction. However, the serrations may be provided with fixed parameters and a single protrusion and a single recess may suffice to be merely brought into meshing engagement with each other. As in the eighth aspect of the present invention, the various parameters of the protrusions, made different from each other for restricting meshing engagement, may include, for instance, cross-sectional shapes (such as width dimensions, heights and inclined angles or the like) and pitches of the protrusions. The various parameters of the plural recesses in meshing engagement with such protrusions may be different from each other in association with the protrusions.

One of or the other one of the leading end of the coupling protrusion and the bottom of the coupling recess may preferably have a columnar positioning pin and a positioning hole having a circular shape in cross-section respectively, which are formed on the tool axis "O" and are rotatable each other when they are fitted. For instance, although the positioning pin is provided on the coupling protrusion at the leading end thereof and the positioning hole is provided on the coupling recess at the bottom thereof, the positioning pin and the positioning hole may be dispensed with.

The bevel head may be preferably made of cemented carbide but may be made of other hard tool materials such as high-speed tool steel and alloy tool steel or the like. The tool body may be preferably made of, for instance, high-speed tool steel but may be made of other tool materials.

In the twelfth aspect of the present invention, the coupling recess is formed in a way to straddle a pair of spiral flutes while extending in a direction perpendicular to the tool axis "O". When applied to an end mill or the like, the coupling recess has no need to necessarily extend in the direction perpendicular to the tool axis "O" and may be formed with a non-circular bottomed recess (bottomed aperture) having an inner wall surface in an entire circumference.

In the thirteenth aspect of the present invention, a fluid supply bore, formed in the tool body along the tool axis "O", is bifurcated in a Y-shape at the vicinity of a leading end, at which the bevel head is mounted, to be opened to the pair of spiral flutes, respectively. However, various modifications may also be made in which when provided with, for instance, the positioning pin and the positioning hole, fluid supply holes may be provided on axes (along the tool axis "O") of those components and opened at relief surfaces of the bevel head in bifurcated ends to allow fluid to be ejected from the relevant relief surfaces. Even when applied to twist drills of the type, having three blades or more, and end mills other than the drills, similar fluid supply bores may be provided depending on needs.

The circumferential abutting portions, provided on the tool body and the bevel head, respectively, may preferably formed in flattened abutting surfaces that are brought into surface contact with each other. However, various modifications may also be made in which either one of or both of the abutting portions are formed in curved surfaces or spherical surfaces to allow abutting engagement to be performed between two components in point contact or in line contact. The axial tight-contact portions may preferably include flattened tight contact surfaces that are brought into surface contact with each other but may be possibly arranged to allow either one of these components to be formed in a curved surface or a spherical surface to be held in line contact or point contact with each other.

Embodiment

Now, an embodiment of the present invention will be described below in detail with reference to the accompanying drawings.

Figure 1A:
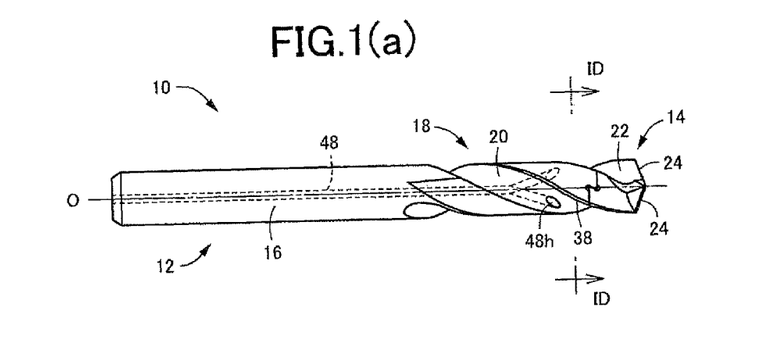
Figure 1B:
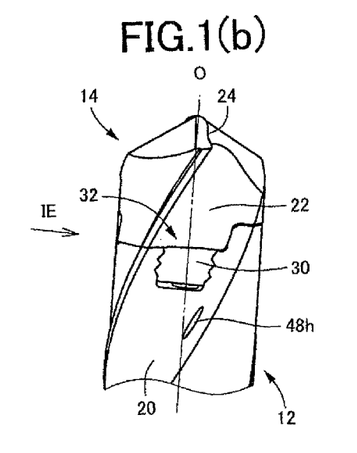
FIG. 1(b) is an enlarged view of a leading end portion of the drill.
Figure 1C:
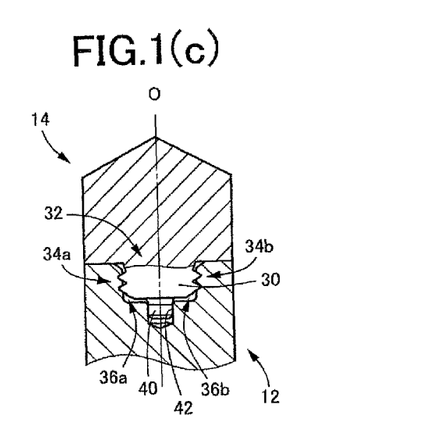
FIG. 1(c) is a vertical cross-sectional view of the leading end portion of the drill.
Figure 1D:
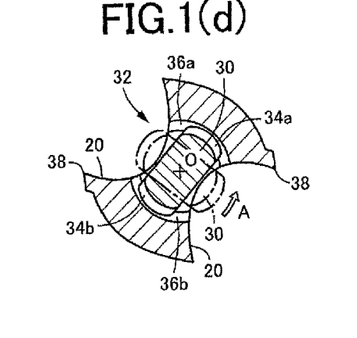
FIG. 1(d) is an enlarged view in cross section taken on line ID-ID in FIG. 1(a)
Figure 1E:
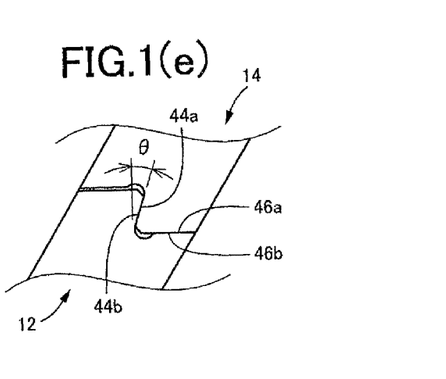
FIG. 1(e) is an enlarged view of a portion as viewed in an arrow IE in FIG. 1(b).
Figure 2A:
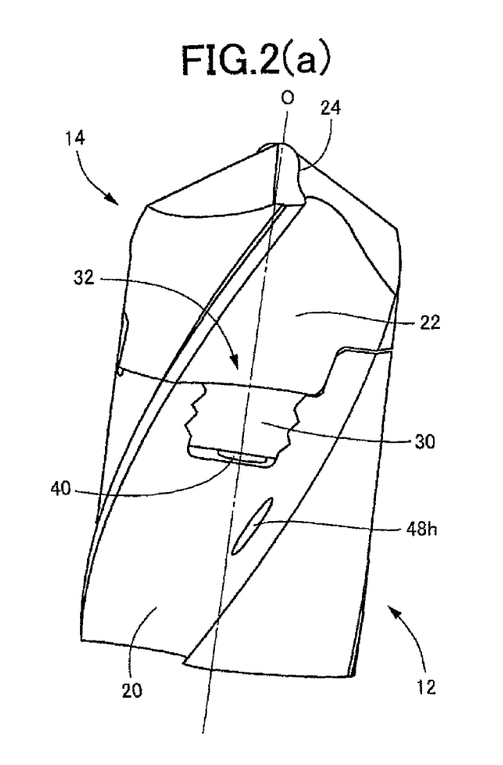
FIGS. 2(a)-(b) represent a front view and a perspective view seen from different positions around the tool axis "O" and showing the leading end portion of the drill of the embodiment of FIGS. 1(a)-(e).
Figure 2B:
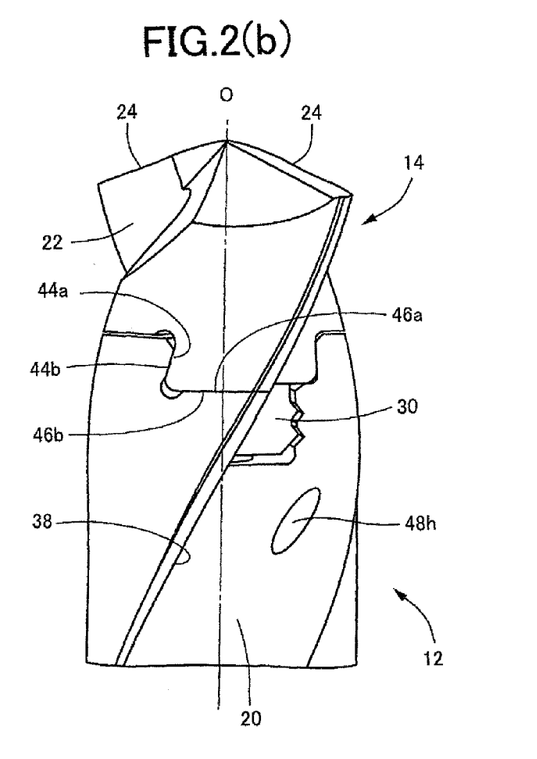
Figure 3A:
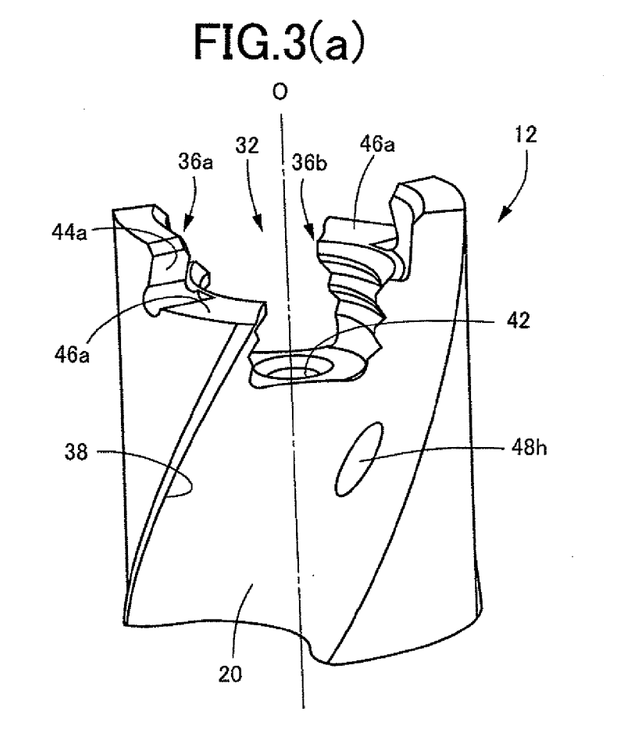
FIGS. 3(a)-(b) are perspective views showing the leading end portion of the tool body of the embodiment of FIGS. 1(a)-(e) as viewed in two directions about the tool axis "O".
Figure 3B:
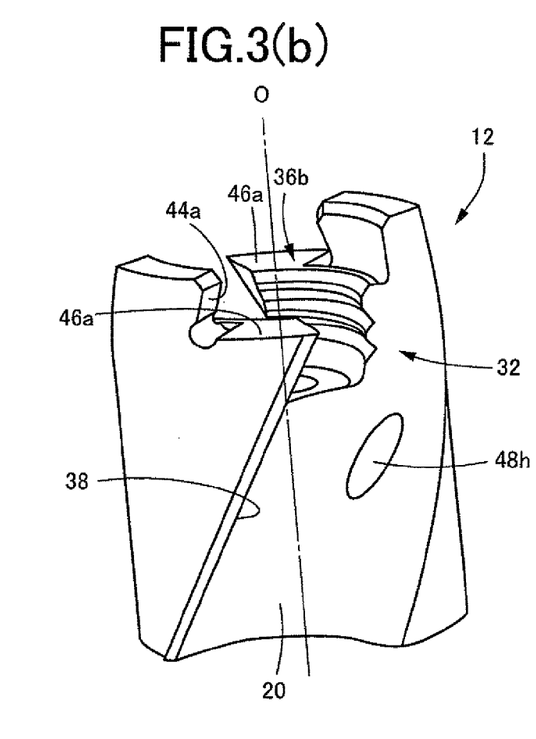
Figure 4A:
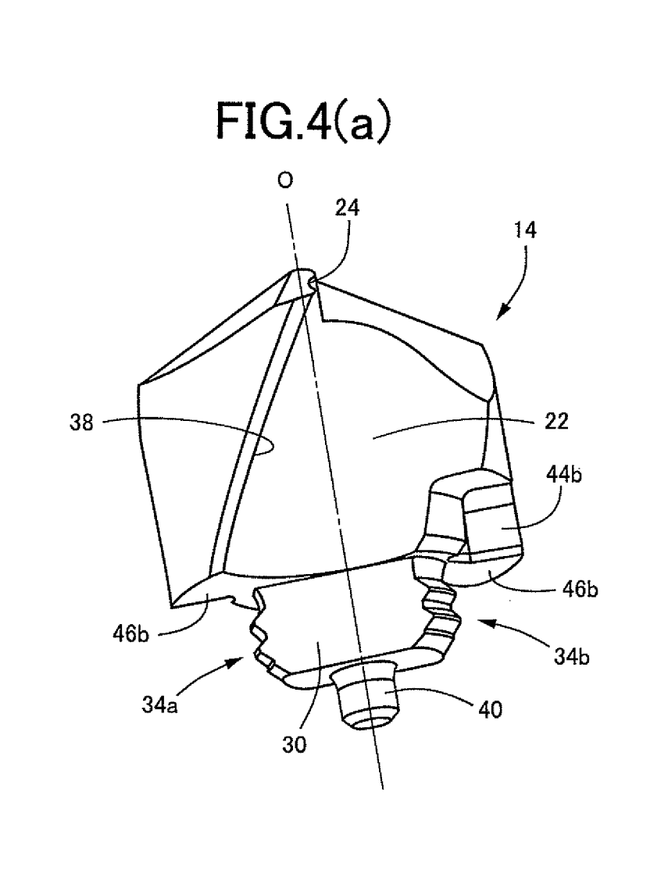
FIGS. 4(a)-(b) represent a front view and a perspective view showing the bevel head of the embodiment of FIGS. 1(a)-(e) as viewed in two directions about the tool axis "O".
Figure 4B:
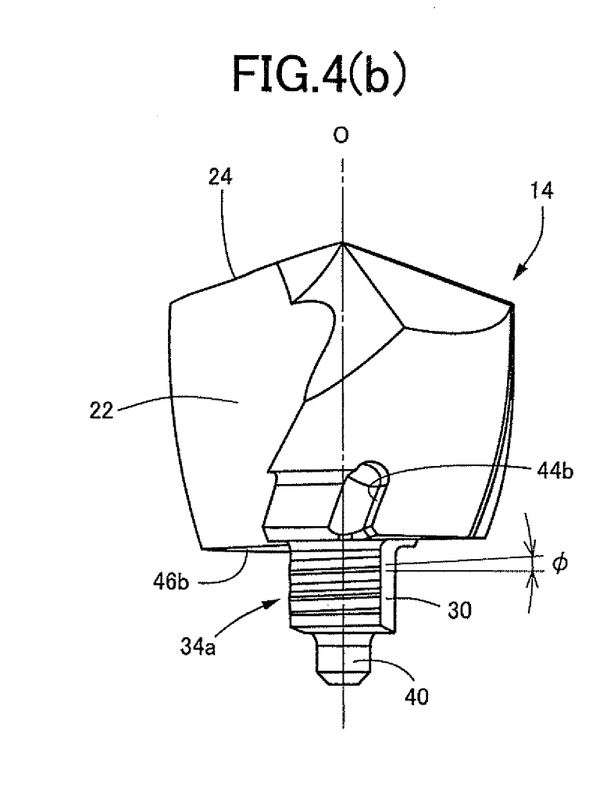

FIGS. 1(a)-(e) are views showing a bevel head replacement twist drill 10 of one embodiment of the present invention; FIG. 1(a) is a front view of the drill as viewed in a direction perpendicular to a tool axis "O"; FIG. 1(b) is an enlarged view of a leading end portion of the drill; FIG. 1(c) is a vertical cross-sectional view of the leading end portion of the drill; FIG. 1(d) is an enlarged view in cross section taken on line ID-ID in FIG. 1(a); and FIG. 1(e) is an enlarged view of a portion as viewed in an arrow IE in FIG. 1(b). The bevel head replacement twist drill 10 is a drill with a twin-blade that includes a shaft-like tool body 12 and a bevel head 14, formed as a separate body from the tool body 12, which is detachably mounted onto the tool body 12 at a leading end thereof in concentric relation thereto for use. FIGS. 2(a)-(b) represent a front view and a perspective view seen from different positions around the tool axis "O" and showing the leading end portion of the drill to which the bevel head 14 is detachably mounted in concentric relation thereto for use. FIGS. 3(a)-(b) are perspective views showing the leading end portion of the tool body 12 as viewed in two directions about the tool axis "O" and FIGS. 4(a)-(b) represent a front view and a perspective view showing the bevel head 14 as viewed in two directions about the tool axis "O".

The tool body 12 includes a columnar shank 16 and a fluted section 18, integrally formed thereon in coaxial relation, which is formed with a pair of spiral flutes 20 fluted clockwise about the tool axis "O" in symmetric relation with respect to the tool axis "O". The bevel head 14 is formed with spiral flutes 22 that are contiguous with the pair of spiral flutes 20 when mounted on the tool body 12. The spiral flutes 22 have leading-end opening edges symmetrically formed with a pair of cutting edges 24. When drivably rotated about the tool axis "O" in a tool rotating direction, that is in a clockwise direction, as viewed from the tool body 12, the cutting edges 24 perform cutting work with chips caused to pass through the spiral flutes 22 and 20 for discharge toward the shank 16. The tool body 12 is made of high speed tool steel and the bevel head 14 is made of cemented carbide and coated with a hard film such as TiN, TiCN, TiAlN, and diamond, etc., depending on needs.

The bevel head 14 has a rear end face, formed with a coupling protrusion 30, and the tool body 12 has a leading end oriented in the tool axis direction and formed with a coupling recess 32 for fitting engagement with the coupling protrusion 30 in the tool axis direction. The coupling protrusion 30 is formed in an elongated shape to be symmetric with respect to the tool axis "O" in cross section perpendicular to the tool axis "O" and has both elongated ends formed with a pair of serrations 34a and 34b to be symmetric with respect to the tool axis "O". The coupling recess 32 penetrates in a direction perpendicular to the tool axis "O" so as to straddle the pair of spiral flutes 20 and has a width dimension greater than that of the coupling protrusion 30. This enables the coupling protrusion 30 to be brought into fitting engagement with the coupling recess 32 as indicated by a single-dot line in FIG. 1(d). In addition, the coupling recess 32 has a pair of inner wall surfaces on which a pair of serrations 36a and 36b are symmetrically formed with respect to the tool axis "O" for meshing engagement with the serrations 34a and 34b, respectively. Intermeshing serrations 34a, 36a and 34b, 36b constitute two sets of serrations.

As shown by a single dot line in FIG. 1(d), the tool body 12 is caused to rotate about the tool axis "O" relative to the bevel head 14 in the tool rotating direction with the coupling protrusion 30 held in fitting engagement with the coupling recess 32. That is, in FIG. 1(d), the tool rotating direction is placed in a clockwise direction for a leading edge 38 and the coupling protrusion 30, indicated by the single dot line, is caused to rotate counter-clockwise relative to the coupling recess 32 about the tool axis "O" as indicated by an arrow A. This allows the serrations 34a, 36a and 34b, 36b to be brought into meshing engagement with each other to block a drop-off (escaping) of the bevel head 14 from the tool body 12 in the tool axis direction. As will be clear from FIG. 1(c), the serrations 34a, 36a and 34b, 36b have respective protrusions formed in triangular ridge shapes with each apex angle falling in a value ranging from 25° to 120° and lying at an angle of about 90° in the present embodiment. A concaved recess between the protrusions takes a triangular recess corresponding to each protrusion in shape. In addition, it is to be construed that none of the dimensional ratios and the angles of various component parts is necessarily and correctly represented.

Further, the serrations 34a, 36a and 34b, 36b have plural protrusions (with two protrusions adopted in the present embodiment) which are spaced from each other in the tool axis direction. Various parameters of the plural protrusions, i.e., for instance, cross-sectional shapes are made different from each other such that the meshing engagement is enabled only when the coupling protrusion 30 and the coupling recess 32 are caused to completely engage with each other in the tool axis direction. Various parameters of the concaved recesses are defined to be different from each other in association with the various parameters of the protrusions. This avoids the occurrence of a mounting failure causing only a single piece of the plural protrusions to be involved in meshing engagement, i.e., causing only a single piece of the two protrusions of the serrations 34a, 36a and 34b, 36b to mesh with each other in FIG. 1(c) while the bevel head 14 is mounted with only one protrusion remained under a floating state.

Further, the serrations 34a, 34b, formed on the coupling protrusion 30, and the serrations 36a, 36b, formed on the coupling recess 32, are arranged to easily mesh with each other when the tool body 12 is caused to rotate in the tool rotating direction relative to the bevel head 14 for meshing engagements between the serrations 34a, 36a and 34b, 36b. That is, in other words, circumferential circular arcs of the serrations 34a, 34b of the coupling protrusion 30 have curvatures made greater than those of the serrations 36a, 36b of the coupling recess 32 to provide increased plays for sides to begin meshing engagements. As shown in FIG. 1(d), more particularly, the circular arcs of the serrations 36a, 36b, formed on the coupling recess 32, are located on a circumference with a center placed on the tool axis "O". On the contrary, the circular arcs of the serrations 34a, 34b, formed on the coupling protrusion 30, have curvatures made greater (less in radius) than those of the circular arcs of the serrations 36a, 36b involving outer circumferences of the protrusions and roots of the concaved recesses as a whole. This enables the meshing engagement to easily begin. The circular arcs of the serrations 34a, 34b, formed on the coupling protrusion 30, have central portions formed in effective diameters corresponding to those of the serrations 36a, 36b of the coupling recess 32. When these central areas begin to mesh with the serrations 36a, 36b of the coupling recess 32, the serrations 34a, 36a and 34b, 36b are properly brought into meshing engagement with each other substantially with no clearance. In addition, the circular arcs of the serrations 34a, 34b of the coupling protrusion 30 are not fixed in curvature and have central portions made relatively small (large in diameter) and varying so as to increase (decrease in diameter) toward an end of each circular arc.

The coupling protrusion 30 has an axial leading end formed with a columnar positioning pin 40 that protrudes on the tool axis "O" and the coupling recess 32 has a bottom wall formed with a positioning hole 42 in line with the tool axis "O" for fitting engagement with the positioning pin 40 to rotate relative thereto. Accordingly, causing the positioning pin 40 to come in fitting engagement with the positioning hole 42 allows the coupling protrusion 30 and the coupling recess 32 to be positioned for relative rotations about the tool axis "O". Thus, causing these components to rotate relative to each other enables the serrations 34a and 34b, formed on the coupling protrusion 30, and the serrations 36a and 36b, formed on the coupling recess 32, to be brought into meshing with each other in a further easy fashion. A distal end of the positioning pin 40 and an opening portion of the positioning hole 42 are chamfered in tapered shapes, respectively, for smooth fitting engagement with each other.

Meanwhile, the tool body 12 and the bevel head 14 have abutting surfaces 44a and 44b formed in two areas symmetric with respect to the tool axis "O" to define a mounting phase about the tool axis "O" in which: when the tool body 12 is caused to rotate in the tool rotating direction relative to the bevel head 14 with the serrations 34a, 36a and 34b, 36b caused to mesh with each other, the tool body 12 and the bevel head 14 are brought into abutting engagement with each other. Thus, the mounting phase for the tool body 12 and the bevel head 14 can be defined such that the spiral flutes 20 and 22 are smoothly contiguous with each other. As shown in FIG. 1(e), moreover, the abutting surfaces 44a and 44b are arranged to be brought into surface contact with each other on flat inclined surfaces. The flat inclined surfaces are inclined in a direction parallel to the tool axis "O" at predetermined inclined angles θ as the inclined surfaces extend toward a tool distal end in the tool rotating direction. This causes forces to act in directions to be pulled with each other in the tool axis direction. The inclined angle θ falls in a range of 0°<θ≤30° with an angle of about 20° being defined in the present embodiment. Thus, when performing hole cutting work upon drivably rotating the bevel head replacement twist drill 10 in the tool rotating direction, rotational torque is properly transferred to the bevel head 14 via the abutting surfaces 44a and 44b. Thus, even if increased cutting resistance is encountered, the cutting can be properly performed with no occurrence of drop-off or limping of the bevel head 14. The abutting surfaces 44a and 44b correspond to circumferential abutting portions.

Further, the tool body 12 and the bevel head 14 have tight contact surfaces 46a and 46b, formed in two areas (i.e., areas contiguous with the leading edges 38 in the present embodiment) symmetric with respect to the tool axis "O", respectively. These tight contact surfaces are brought into tight contact with each other in the tool axis direction on the mounting phase under given pressing loads when the tool body 12 is caused to rotate relative to the bevel head 14 in the tool rotating direction with the serrations 34a and 36a, and 34b and 36b held in meshing engagement with each other.

That is, the serrations 34a, 36a and 34b, 36b are inclined in a direction perpendicular to the tool axis "O" at predetermined inclined angles φ (see FIG. 4(b)) against the tool distal end along the tool rotating direction. This allows the tool body 12 and the bevel head 14 to move closer to each other in the tool axis direction when the tool body 12 is caused to rotate relative to the bevel head 14 in the tool rotating direction with the serrations 34a, 36a and 34b, 36b held in meshing engagement with each other. The inclined angles φ fall in a range expressed as $0°≤φ≤15°$ and the inclined angle φ of at least one of the serrations 34a and 34b of the coupling protrusion 30 and the serrations 36a and 36b of the coupling recess 32 may suffice to be positive but both of these serrations are inclined at angles of approximately 8° in the present embodiment. Moreover, the tight contact surfaces 46a and 46b are arranged to be brought into surface contact with each other on flat surfaces nearly perpendicular to the tool axis "O". Thus, causing the bevel head 14 and the tool body 12 to move closer to each other in the tool axis direction with the serrations 34a, 36a and 34b, 36b being slightly inclined results in a wedge effect. This causes the tight contact surfaces 46a and 46b to be brought into tight contact with each other in the tool axis direction under the predetermined pressing loads with a resultant occurrence of friction under which the bevel head 14 is firmly fixed to the tool body 12. This properly prevents the occurrence of loosening or limping of the bevel head 14 to provide a stable coupling state even during hole-cutting work while favorably sustaining a coupling strength even when the bevel head 14 and the tool body 12 are subjected to repeated coupling or decoupling effects. The tight contact surfaces 46a and 46b correspond to axial tight-contact portions.

Further, the serrations 34a and 34b of the coupling protrusion 30 and the serrations 36a and 36b of the coupling recess 32 are arranged to be different slightly in various parameters, i.e., for instance, in pitches or inclined angles φ of the plural protrusions in the tool axis direction. This allows the relevant serrations to mesh with each other under lessened meshing loads due to plays present on an early meshing stage whereas, when subjected to relative rotations to move to the mounting phase, the relevant serrations are brought into meshing engagement with each other under relatively large meshing loads in the absence of plays. Thus, even with the mutual frictions between the serrations 34a, 36a and 34b, 36b under such meshing loads, the occurrence of loosening or limping of the bevel head 14 can be prevented, resulting in a further increase in coupling strength in association with friction between the tight contact surfaces 46a and 46b. Then, stable coupling state is preferably preserved. This allows the tight contact surfaces 46a and 46b to be held in tight contact with each other under the predetermined pressing loads due to elastic deformations, etc., of the serrations 34a, 36a and the 34b, 36b while enabling the serrations 34a, 36a and the 34b, 36b to mesh with each other under predetermined meshing loads.

The tool body 12 has one fluid supply hole 48 extending from a rear end of the tool body 12 in the tool axis "O" and bifurcated in a Y-shape at the vicinity of the leading end, at which the bevel head 14 is mounted, to be open to the pair of spiral flutes 20 respectively. 48h indicates opening of the fluid supply hole 48. This enables a fluid, such as lubricating oil or cooling air, to be appropriately supplied to the vicinity of the bevel head 14 when needed, and it is unnecessary for the bevel head 14 to have a fluid supply hole, then, the tool can be made in a simplified structure at low cost.

With the bevel head replacement twist drill 10 of the present embodiment, the tool body 12 is caused to rotate relative to the bevel head 14 in the tool rotating direction with the coupling protrusion 30 and the coupling recess 32 formed on one and the other of the tool body 12 and the bevel head 14 for fitting engagement with each other in the tool axis direction. This allows the two sets of serrations 34a, 36a and 34b, 36b, formed on the coupling protrusion 30 and the coupling recess 32 in areas separate from each other in a circumferential direction, to be brought into meshing engagement with each other. This blocks the occurrence of drop-off of the bevel head 14 while causing the abutting surfaces 44a and 44b to be brought into abutting engagement with each other, thereby defining the mounting phase about the tool axis "O". In addition, when demounting the bevel head 14 from the tool body 12, the bevel head 14 and the tool body 12 may suffice to be rotated relative to each other in opposite directions, enabling the mounting and demounting to be easily and quickly performed on one touch action.

Meanwhile, as the tool body 12 is caused to rotate relative to the bevel head 14 to the mounting phase with the two sets of serrations 34a, 36a and 34b, 36b held in meshing engagement with each other; the tight contact surfaces 46a and 46b, formed on the bevel head 14 and the tool body 12 in areas symmetric with respect to the tool axis "O" respectively, are brought into tight contact with each other in the tool axis direction under the predetermined pressing loads. This prevents the occurrence of loosening or limping of the bevel head 14 due to friction between the tight contact surfaces 46a and 46b. This allows the abutting surfaces 44a and 44b to define the mounting phase about the tool axis "O", while enabling a firm coupling state to be stably obtained during the use of the tool.

With the present embodiment, the two sets of serrations 34a, 36a and 34b, 36b are inclined at the predetermined inclined angles φ in the direction perpendicular to the tool axis "O". This allows the bevel head 14 and the tool body 12 to move closer to each other in the tool axis direction when the bevel head 14 and the tool body 12 are caused to rotate relative to each other in the tool rotating direction with the two sets of serrations 34a, 36a and 34b, 36b held in meshing engagement with each other. Thus, the tight contact surfaces 46a and 46b can be appropriately held in tight contact with each other owing to the serrations 34a, 36a and 34b, 36b being inclined, thereby providing a firm coupling state in a stable fashion. In particular, the inclined angle φ falls in a range expressed as $0°≤φ≤15°$ and the tight contact surfaces 46a and 46b take the form of the flattened surfaces that are brought into surface contact with each other at nearly right angles with respect to the tool axis "O". This allows the wedge action to occur in the presence of such a small inclined angle φ whereby the tight contact surfaces 46a and 46b can be brought into tight contact with each other to be firmly fixed in the presence of friction. This appropriately prevents the occurrence of loosening or limping of the bevel head 14, while favorably keeping coupling strength even when the bevel head 14 is repeatedly mounted on or demounted from the tool body 12.

With the present embodiment, further, the serrations 34a and 34b of the coupling protrusion 30 and the serrations 36a and 36b of the coupling recess 32 have the various parameters that are slightly different from each other for meshing engagement with each other under the relatively large meshing loads when relatively rotated to the mounting phase. This appropriately prevents the occurrence of loosening or limping of the bevel head 14 even in the presence of mutual frictions among the serrations 34a, 36a and 34b, 36b due to meshing load. This results in, in cooperation with friction between the tight contact surfaces 46a and 46b, further increases in coupling strength such that a further stable coupling state is favorably maintained.

With the present embodiment, furthermore, the abutting surfaces 44a and 44b, playing a role as the circumferential abutting portions, are arranged to generate forces acting to pull the circumferential abutting portions each other toward the tool axis in the direction parallel to the tool axis "O" on the inclined surfaces inclined at the given inclined angles θ. This results in an effect to cause the tight contact surfaces 46a and 46b, serving as axial tight-contact portions, to be further firmly brought into tight contact with each other due to torque applied to the abutting surfaces 46a and 46b when the bevel head replacement twist drill 10 is drivably rotated in the tool rotating direction to perform hole cutting work. This makes it possible to appropriately perform cutting work with no occurrence of loosening or limping of the bevel head 14 even when subjected to large cutting torque (rotational resistance).

With the present embodiment, moreover, the serrations 34a and 34b, formed on the coupling protrusion 30, have the circumferential circular arcs with the respective curvatures made greater than those of the serrations 36a and 36b formed on the coupling recess 32. This allows meshing engagement to be easily performed when the tool body 12 is caused to rotate in the tool rotating direction relative to the bevel head 14 with the serrations 34a, 36a and 34b, 36b brought into meshing engagement with each other. This suppresses the occurrence of restraints of the serrations 34a, 36a and 34b, 36b during the meshing engagements such that smooth meshing engagements can be achieved. Further, since rotating the tool body 12 and the bevel head 14 are rotated relative to each other until the abutting surfaces 44a and 44b are brought into a mounting phase for abutting engagement, the serrations 34a, 36a and 34b, 36b can be appropriately brought into meshing engagement with each other. This makes it possible to have predetermined coupling strength, thereby enabling coupling work of the bevel head 14 to be further easily performed.

With the present embodiment, besides, the protrusions of the serrations 34a, 36a and 34b, 36b are formed in the triangular ridge shapes with each apex angle ranging from 25° to 120°. Thus, the coupling condition can be favorably maintained even owing to the occurrence of meshing frictions among the serrations 34a, 36a and 34b, 36b.

With the present embodiment, the serrations 34a, 36a and 34b, 36b are formed in two protrusions, respectively, and the two protrusions have various parameters different from each other so as to achieve the meshing engagements only when the coupling protrusion 30 and the coupling recess 32 are completely brought into fitting engagement with each other in the tool axis direction. This reliably prevents the occurrence of a failure of causing the bevel head 14 to be mounted on the tool body 12 in a state remained under incomplete fitting engagement.

With the present embodiment, further, the positioning pin 40 and the positioning hole 42 are formed on the leading end of the coupling protrusion 30 and the bottom of the coupling recess 32 on the tool axis "O", respectively, for fitting engagement with each other in rotating capabilities relative to each other. This allows the bevel head 14 and the tool body 12 to be positioned in concentric relation such that coupling work can be further smoothly and easily performed when these components are caused to rotate relative to each other with the serrations 34a, 36a and 34b, 36b brought into meshing engagement with each other.

With the present embodiment, furthermore, the bevel head 14 is made of cemented carbide such that the coupling protrusion 30 is formed on the bevel head 14. This enables the bevel head 14, having the coupling protrusion 30 and the serrations 34a and 34b and the cutting edge 24 or the like, to be unitarily formed in easy fashion using a molding die. The tool body 12, formed with the coupling recess 32, is made of high-speed tool steel, thereby enabling the coupling recess 32 and the serrations 36a and 36b to be relatively easily formed by cutting work or electric spark machining, etc.

With the present embodiment, moreover, the coupling protrusion 30 has an elongated shape symmetric with respect to the tool axis "O" in cross section perpendicular to the tool axis "O" and has both longitudinal end portions formed with the serrations 34a and 34b for meshing engagements with the pair of the serrations 36a and 36b formed on the inner circumferential surface of the coupling recess 32 in shapes symmetric with respect to the tool axis "O". Thus, the two sets of serrations 34a, 36a and 34b, 36b enables the bevel head 14 to be appropriately mount onto the tool body 12 in a stable mounting attitude.

Further, the present embodiment is related to the two-blade twist drill having the pair of spiral flutes 20 and 22 continuously formed on the bevel head 14 and the tool body 12 so as to straddle the same. With the coupling recess 32 formed in a way to straddle the pair of spiral flutes 20 so as to extend in a direction perpendicular to the tool axis "O", the coupling recess 32 can be appropriately formed while enabling the coupling protrusion 30 to be appropriately brought into fitting engagement with the coupling recess 32.

With the present embodiment, furthermore, the tool body 12 has the fluid supply hole 48 formed on the tool axis "O" to be bifurcated in the Y-shape at the vicinity of the leading end, at which the bevel head 14 is mounted, to be opened at the pair of spiral flutes 20, respectively. This enables a fluid, such as lubricating oil and cooling air, etc., to be appropriately supplied to the vicinity of the bevel head 14 with no need arising for the bevel head 14 to have a fluid supply hole with a resultant structure that is simple and low cost.

Figure 5A:
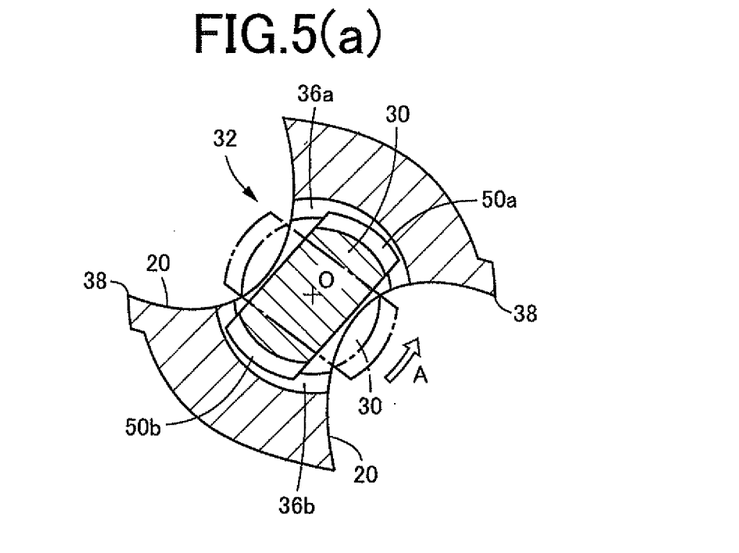
FIG. 5(a)-(b) are cross-sectional views corresponding to FIG. 1(d), respectively, showing another embodiments according to the present invention.
Figure 5B:
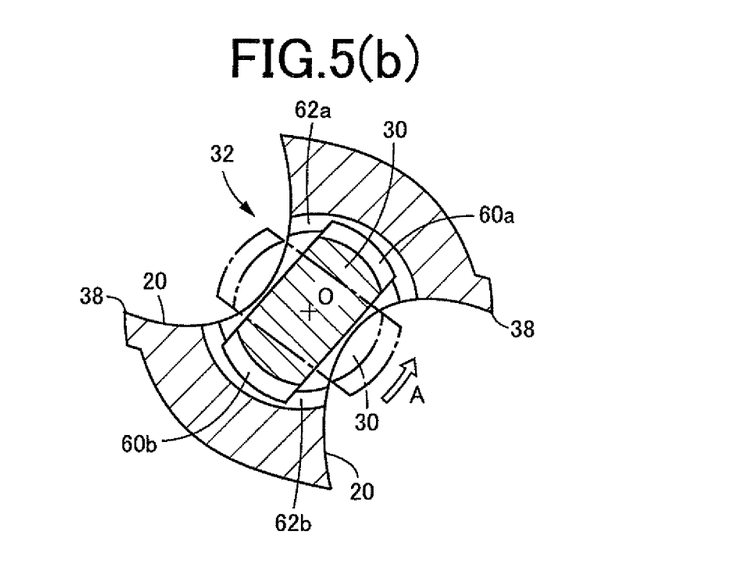

With the present embodiment, besides, the circular arcs of the serrations 34a and 34b of the coupling protrusion 30 have the curvatures greater than those of the serrations 36a and 36b of the coupling recess 32 for easy meshing engagement when the tool body 12 is caused to rotate relative to the bevel head 14 in the tool rotating direction with the serrations 34a, 36a and 34b, 36b being brought into meshing engagement with each other. As shown in FIGS. 5(a) and (b), however, the coupling protrusions 30 may have serrations 50a, 50b and 60a, 60b and the coupling recesses 32 may have serrations 36a, 36b and 62a, 62b with effective diametric portions having circular arcs with respective curvatures being nearly equal to each other under which the circular arcs have centers deviated from each other. In FIG. 5(a), the serrations 36a and 36b of the coupling recess 32 are nearly equal to those of the previous embodiment with the centers of the circular arc configurations being placed on the tool axis "O". However, the circular arcs of the serrations 50a and 50b, formed on the coupling protrusion 30, are arranged to have centers deviated from the tool axis "O", then a portion on a side to begin meshing engagements (i.e., a side closer to the leading ends facing a counter-clockwise direction of the tool axis "O") are arranged to be closer to the tool axis "O" and plays between the serrations 36a and 36b is increased. In FIG. 5(b), the serrations 60a and 60b of the coupling protrusion 30 are arranged to have circular arcs with centers placed on the tool axis "O". However, the circular arcs of the serrations 62a and 62b, formed on the coupling recess 32, are arranged to have centers deviated from the tool axis "O" to allow engagement beginning sides (i.e., sides closer to opening ends facing a clockwise direction of the tool axis "O") to be apart from the tool axis "O" and to have plays between the serrations 60a and 60b increased.

While the embodiment of the present invention has been described above in detail with reference to the accompanying drawings, it is intended that the present invention described be considered only as illustrative of the embodiments and that the present invention may be implemented in various modifications and improvements based on knowledge of those skilled in the art.

The invention claimed is:

1. A bevel head replaceable rotary tool having a shaft-like tool body and a bevel head, formed as a separate body from the tool body, which is detachably mounted on the tool body at a leading end thereof in a concentric relation thereto, the rotary tool comprising:

a coupling protrusion, provided on the bevel head and a coupling recess provided on the tool body, each of, which are non-circular in shape in cross section perpendicular to a tool axis "O" and are provided for fitting engagement in a tool axis direction;

serrations having plural protrusions, separated in the tool axis direction, which are provided on an outer circumferential surface of the coupling protrusion and an inner wall surface of the coupling recess, respectively, and one of the serrations of the coupling protrusion and a corresponding one of the serrations of the coupling recess together constituting a set of serrations, the serrations of the coupling protrusion and the corresponding serrations of the coupling recess together constituting plural sets of serrations to be separate from each other in circumferential directions under which rotating the tool body about the tool axis "O" relative to the bevel head in a tool rotating direction with the coupling protrusion and the coupling recess held in fitting engagement in the tool axis direction allows the plural protrusions of the serrations of the coupling protrusion and the plural protrusions of the serrations of the coupling recess to mesh with each other in each of the plural sets of serrations, such that the bevel head is blocked from escaping from the tool body in the tool axis direction;

circumferential abutting portions provided on the tool body and the bevel head, respectively, which are abutted with each other when the tool body is caused to rotate (about the tool axis "O") relative to the bevel head in the tool rotating direction with the plural protrusions held in meshing engagement such that a mounting phase about the tool axis "O" is defined; and axial tight-contact portions, provided on the tool body and the bevel head, respectively, which are brought into tight contact with each other in the tool axis direction under predetermined pressing loads on the mounting phase when the tool body is caused to rotate relative to the bevel head in the tool rotating direction with the plural protrusions held in meshing engagement, the serrations of the coupling protrusion and the serrations of the coupling recess being arranged such that curvatures of circumferential circular arcs of the serrations of the coupling protrusion are made greater than those of the serrations of the coupling recess or the serrations of the coupling protrusion and the serrations of the coupling recess have circumferential circular arcs with centers deviated from each other whereby when the tool body is caused to rotate relative to the bevel head in the tool rotating direction, the plural protrusions are brought into meshing engagement with each other, the serrations of the coupling protrusion and the serrations of the coupling recess having inclined angles φ falling in a range of 0°≤φ≤15° from directions perpendicular to the tool axis "O" and the inclined angle φ of at least one of the serrations of the coupling protrusion and the serrations of the coupling recess being positive to allow the bevel head and the tool body to move closer to each other in the tool axis direction when the tool body is caused to rotate relative to the bevel head in the tool rotating direction with the serrations held in meshing engagement with each other, and the axial tight-contact portions, provided on the tool body and the bevel head, respectively, having flattened tight contact surfaces nearly perpendicular to the tool axis "O" for engagement in surface contact with each other.

2. The bevel head replaceable rotary tool according to claim 1, wherein the serrations of the coupling protrusion and the serrations of the coupling recess have at least one of pitches in the tool axial direction and the inclined angles φ of the plural protrusions different from each other so as to mesh with each other under predetermined meshing loads in the mounting phase when the tool body is caused to rotate about the tool axis "O" relative to the bevel head in the tool rotating direction with the set of serrations held in meshing engagement with each other.

3. The bevel head replaceable rotary tool according to claim 1, wherein the circumferential abutting portions have inclined surfaces inclined at predetermined inclined angles θ from directions parallel to the tool axis "O" to cause forces to act in directions where the bevel head and the tool body are moved closer to each other in the tool axis direction.

4. The bevel head replaceable rotary tool according to claim 1, wherein the serrations have protrusions having triangular shape in with apex angles falling in a range between 25° and 120°.

5. The bevel head replaceable rotary tool according to claim 1, wherein the serrations have at least one of cross-sectional shapes and pitches of the plural protrusions different from each other for meshing engagement only when the coupling protrusion and the coupling recess are completely brought into fitting engagement with each other in the tool axis direction.

6. The bevel head replaceable rotary tool according to claim 1, wherein one and the other one of a leading end of the coupling protrusion and a bottom portion of the coupling recess include a positioning pin and a positioning hole formed on the tool axis "O" for fitting engagement to be rotatable relative to each other.

7. The bevel head replaceable rotary tool according to claim 1, wherein the bevel head is made of cemented carbide and the coupling protrusion is provided on the bevel head while the coupling recess is provided on the tool body.

8. The bevel head replaceable rotary tool according to claim 1, wherein the coupling protrusion is formed in an elongated shape symmetric with respect to the tool axis "O" in cross section perpendicular to the tool axis "O" and the serrations are provided on the coupling protrusion at both elongated ends thereof for meshing engagement with the pair of serrations formed on the inner wall surface of the coupling recess to be symmetric with regard to the tool axis "O".

9. The bevel head replaceable rotary tool according to claim 1, wherein the bevel head replaceable rotary tool includes a two-blade twist drill having a pair of spiral flutes formed to be symmetric with respect to the tool axis "O" and straddling the bevel head and the tool body in contiguous fashions, and wherein the coupling recess is formed in a way to straddle the pair of spiral flutes to penetrate in a direction perpendicular to the tool axis "O".

10. The bevel head replaceable rotary tool according to claim 9, wherein the tool body has a fluid supply hole formed on the tool axis "O" and bifurcated in a Y-shape at the vicinity of the leading end at which the bevel head is mounted, and openings of the bifurcated fluid supply hole are formed on the pair of spiral flutes.

11. A bevel head for use in the bevel head replaceable rotary tool defined in claim 1.

12. A tool body for use in the bevel head replaceable rotary tool defined in claim 1.

\* \* \* \* \*